(12) United States Patent
Balmakhtar et al.

(10) Patent No.: US 9,986,483 B1
(45) Date of Patent: May 29, 2018

(54) HANDOFF TARGET SELECTION BASED ON MEDIA TYPE

(71) Applicant: Sprint Communications Company L.P., Overland Park, KS (US)

(72) Inventors: Marouane Balmakhtar, Alexandria, VA (US); Aaron Paul Hinkle, Centreville, VA (US); G. Murat Karabulut, Herndon, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days. days.

(21) Appl. No.: 15/069,205

(22) Filed: Mar. 14, 2016

(51) Int. Cl.
*H04W 4/00* (2018.01)
*H04W 36/38* (2009.01)
*H04J 11/00* (2006.01)
*H04W 72/04* (2009.01)
*H04W 36/32* (2009.01)
*H04W 36/00* (2009.01)
*H04W 28/02* (2009.01)
*H04W 88/02* (2009.01)
*H04W 88/08* (2009.01)

(52) U.S. Cl.
CPC .............. *H04W 36/38* (2013.01); *H04J 11/00* (2013.01); *H04W 28/0268* (2013.01); *H04W 36/0083* (2013.01); *H04W 36/32* (2013.01); *H04W 72/048* (2013.01); *H04W 72/0486* (2013.01); *H04W 88/02* (2013.01); *H04W 88/08* (2013.01)

(58) Field of Classification Search
None
See application file for complete search history.

(56) References Cited

U.S. PATENT DOCUMENTS

| | | | |
|---|---|---|---|
| 5,796,722 A | 8/1998 | Kotzin et al. | |
| 7,299,019 B1 | 11/2007 | Austin et al. | |
| 8,027,680 B2 | 9/2011 | Thalanany et al. | |
| 8,345,625 B2 | 1/2013 | Park | |
| 8,849,282 B2 | 9/2014 | Serravalle et al. | |
| 9,713,042 B2 * | 7/2017 | Lu ..................... | H04W 36/0055 |
| 2006/0280146 A1 | 12/2006 | Koodli et al. | |
| 2008/0085712 A1 * | 4/2008 | Han ..................... | H04W 36/04 455/440 |
| 2008/0130578 A1 | 6/2008 | Wang et al. | |
| 2008/0167041 A1 | 7/2008 | Wang et al. | |
| 2009/0154426 A1 | 6/2009 | Perraud et al. | |
| 2012/0021740 A1 | 1/2012 | Vaidyanathan et al. | |
| 2012/0307794 A1 | 12/2012 | Shaheen et al. | |

(Continued)

*Primary Examiner* — Rebecca E Song (57) ABSTRACT

An LTE base station facilitates handoffs in an LTE communication system. The LTE base station is configured to exchange session communications with a UE and receive session information transmitted from an LTE communication control system, the session information including a media type of the communication session and a vector associated with the UE. The LTE base station is further configured to identify a plurality of candidate base stations within a proximity threshold to a path of the vector associated with the UE, poll the plurality of candidate base stations for capability information, process the capability information to determine a set of the candidate base stations that support the media type of the communication session, select a target base station for a handoff from the set of the candidate base stations that support the media type, and instruct the UE to initiate the handoff to the target base station.

3 Claims, 5 Drawing Sheets

(56) References Cited

U.S. PATENT DOCUMENTS

| | | |
|---|---|---|
| 2013/0065596 A1 | 3/2013 | Frederiksen et al. |
| 2014/0095713 A1* | 4/2014 | Miller .................. H04W 36/08 |
| | | 709/225 |
| 2014/0341124 A1* | 11/2014 | Ronneke ............... H04W 76/02 |
| | | 370/329 |
| 2015/0011224 A1* | 1/2015 | Kompalli Chakravartula |
| | | ......................... H04W 36/0083 |
| | | 455/438 |
| 2015/0223117 A1* | 8/2015 | Jha .................... H04W 36/0016 |
| | | 455/436 |
| 2015/0257051 A1 | 9/2015 | Rao et al. |
| 2016/0088527 A1* | 3/2016 | Wolff ............... H04W 36/0055 |
| | | 455/436 |

* cited by examiner

FIGURE 5

HANDOFF TARGET SELECTION BASED ON MEDIA TYPE

TECHNICAL BACKGROUND

Wireless communication systems typically include wireless access nodes which provide access to communication services for wireless communication devices over wireless links. A typical wireless communication system includes systems to provide wireless access across a geographic region, with different wireless coverage areas associated with individual wireless access nodes. The wireless access systems exchange communications between wireless communication devices, service providers, and other network elements. The communications typically include voice calls, data exchanges, web pages, streaming media, text messages, and other communication services. The data exchanged in a communication session may be classified by media type. The wireless communication devices utilize "forward link" or "downlink" communication channels to receive voice and/or data transmitted from the wireless access node, and "reverse link" or "uplink" communication channels to transmit information up to the node.

In Long-Term Evolution (LTE) communication systems, a wireless communication device is referred to as User Equipment (UE), while a wireless access node is called an enhanced Node B (eNodeB). In LTE systems, handoffs are typically controlled by the network but may receive assistance from the UE. Typically, the UE would start sending measurement reports to a serving eNodeB that include signal measurements of candidate cells. The eNodeB may then use the information in the measurement report to make and execute a handoff decision for the UE.

OVERVIEW

A method of operating a Long-Term Evolution (LTE) base station to facilitate handoffs in an LTE communication system is disclosed. The method comprises exchanging session communications with a User Equipment (UE) device during a communication session, and receiving session information transmitted from an LTE communication control system, the session information including a media type of the communication session and a vector associated with the UE device. The method further comprises identifying a plurality of candidate base stations within a proximity threshold to a path of the vector associated with the UE device. The method further comprises polling the plurality of candidate base stations for capability information and processing the capability information to determine a set of the candidate base stations that support the media type of the communication session. The method further comprises selecting a target base station for a handoff from the set of the candidate base stations that support the media type and instructing the UE device to initiate the handoff to the target base station.

A computer apparatus to operate an LTE base station to facilitate handoffs in an LTE communication system comprises software instructions and at least one non-transitory computer-readable storage medium storing the software instructions. The software instructions are configured, when executed by the LTE base station, to direct the LTE base station to exchange session communications with a UE device during a communication session and receive session information transmitted from an LTE communication control system, the session information including a media type of the communication session and a vector associated with the UE device. The software instructions are further configured to direct the LTE base station to identify a plurality of candidate base stations within a proximity threshold to a path of the vector associated with the UE device, poll the plurality of candidate base stations for capability information, and process the capability information to determine a set of the candidate base stations that support the media type of the communication session. The software instructions are further configured to direct the LTE base station to select a target base station for a handoff from the set of the candidate base stations that support the media type and instruct the UE device to initiate the handoff to the target base station.

An LTE base station to facilitate handoffs in an LTE communication system comprises a wireless communication transceiver, a communication transceiver, and a processing system. The wireless communication transceiver is configured to exchange session communications with a UE device during a communication session. The communication transceiver is configured to receive session information transmitted from an LTE communication control system, the session information including a media type of the communication session and a vector associated with the UE device. The processing system is configured to identify a plurality of candidate base stations within a proximity threshold to a path of the vector associated with the UE device and poll the plurality of candidate base stations for capability information. The processing system is further configured to process the capability information to determine a set of the candidate base stations that support the media type of the communication session, select a target base station for a handoff from the set of the candidate base stations that support the media type, and instruct the UE device to initiate the handoff to the target base station.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
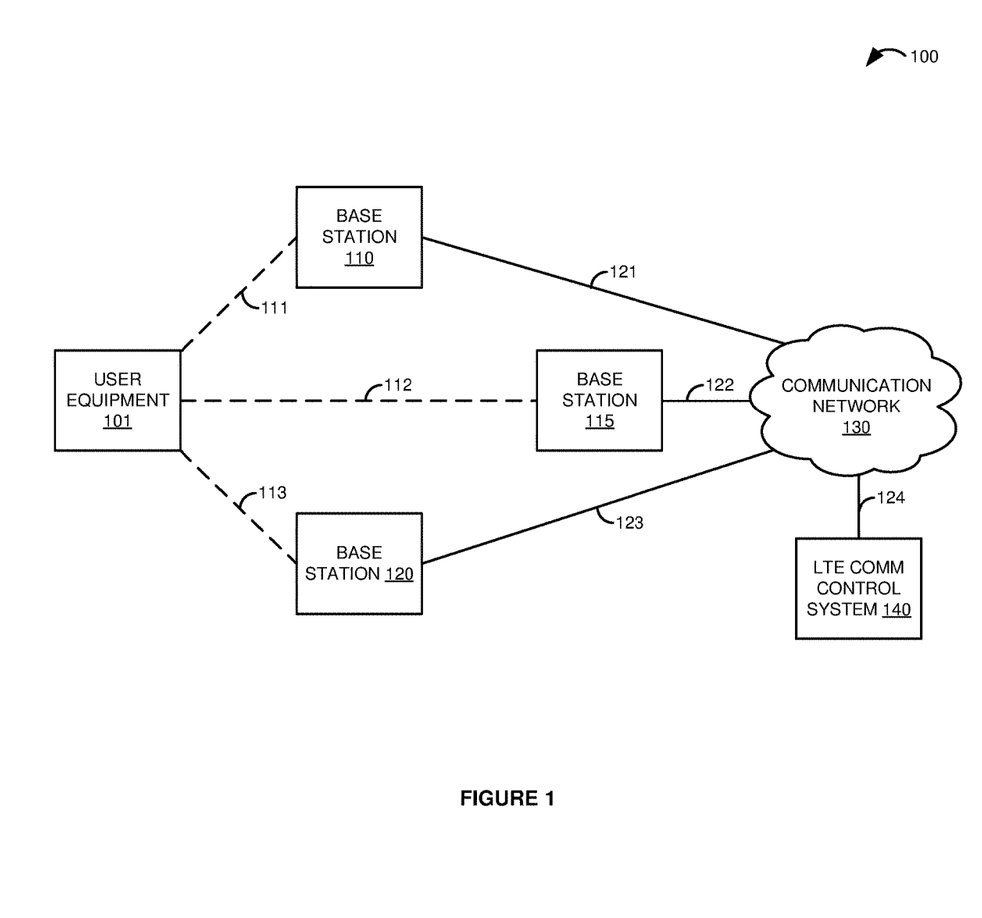
FIG. 1 is a block diagram that illustrates a communication system.

FIG. 1 is a block diagram that illustrates communication system 100. Communication system 100 includes User Equipment (UE) 101, base stations 110, 115, and 120, communication network 130, and LTE communication control system 140. UE 101 and base station 110 are in communication over wireless communication link 111. UE 101 and base station 115 may communicate over wireless communication link 112, while UE 101 and base station 120 may communicate over wireless communication link 113. Base station 110 and communication network 130 are in communication over communication link 121. Likewise, base station 115 and communication network 130 communicate over communication link 122, while base station 120 and communication network 130 communicate over communication link 123. LTE communication control system and communication network 130 are in communication over communication link 124.

Figure 2:
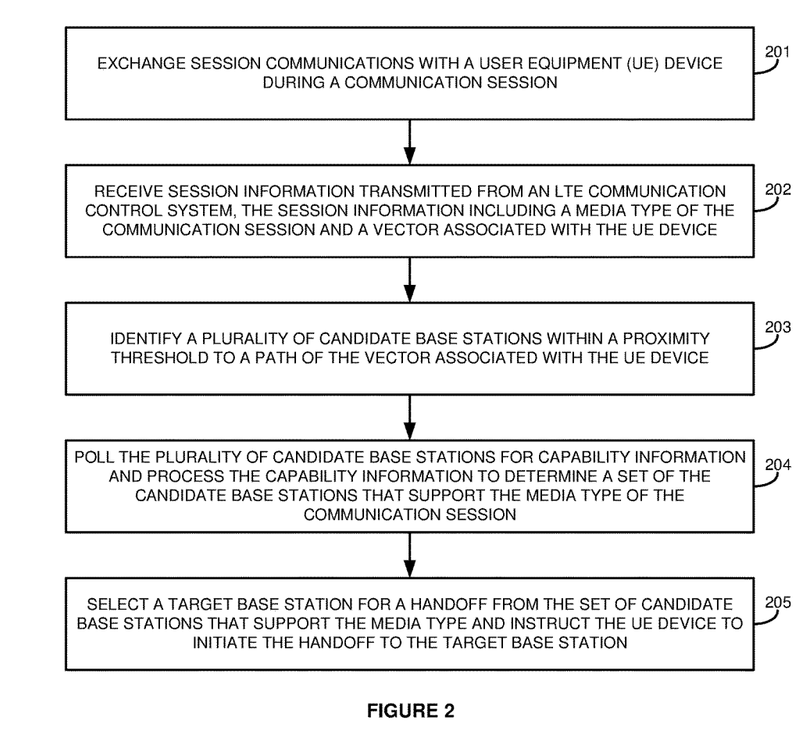
FIG. 2 is a flow diagram that illustrates an operation of the communication system.

FIG. 2 is a flow diagram that illustrates an operation of communication system 100. The steps of the operation are indicated below parenthetically. The operation of communication system 100 shown in FIG. 2 may be employed by base station 110 to facilitate handoffs in an LTE communication system. In order to illustrate its operations, the following discussion of the process shown in FIG. 2 will proceed with reference to base station 110 serving UE device 101 as shown in FIG. 1, but note that the details provided in FIG. 1 are merely exemplary and not intended to limit the scope of the process to the specific implementation shown in FIG. 1.

In the operational flow of FIG. 2, base station 110 exchanges session communications with UE 101 during a communication session (201). UE 101 is typically operated by a user to participate in the communication session with another user, device, system, or some other network resource accessible over communication network 130. The session communications exchanged between base station 110 and UE 101 could comprise any voice or data communications for UE 101, such as voice calls, streaming media, short message service (SMS) and multimedia message service (MMS) messages, email, web page content, application data, file transfers, signaling, and any other communication session data.

Base station 110 receives session information transmitted from LTE communication control system 140, the session information including a media type of the communication session and a vector associated with UE 101 (202). Base station 110 could receive the session information at any point before or during the communication session for UE 101, including continually receiving updated information throughout the communication session. Additionally or alternatively, in some examples base station 110 could have pre-existing knowledge of the media type associated with the communication session, or could determine the media type from analyzing the session communications exchanged with UE 101, such as by inspecting packet headers and other information associated with the communication session. In some examples, LTE communication control system 140 could comprise a mobility management entity (MME), policy and charging rules function (PCRF), or any other LTE network element of communication network 130, including combinations thereof. In this example, the session information includes a media type of the communication session and a vector associated with UE 101, but the session information could include additional or alternative information in other examples. For example, the session information could include a bit rate, codec, resolution, and other properties of the communication session in some examples. The media type of the communication session comprises an identifier of the format and contents of media transmissions. Some examples of different media types may include text, application, audio, video, image, example, message, model, and multipart. Each of these top-level media type names can further indicate various subtypes. For example, the top-level 'text' media type may include an 'html' subtype. Although not always included in the session information, the vector associated with UE 101 typically indicates a location, direction, and velocity of UE 101.

Base station 110 identifies a plurality of candidate base stations 115 and 120 within a proximity threshold to a path of the vector associated with UE 101 (203). Base station 110 typically processes the vector associated with UE 101 received in the session information in order to determine the trajectory of the vector path of UE 101. For example, the location, direction, and velocity of UE 101 indicated by the vector can be used by base station 110 to determine which base stations 115 and 120 are within the vector path of UE 101. Base station 110 can then compare the proximity threshold to the distance between each base station 115 and 120 and the vector path of UE 101 to identify which of the base stations 115 and 120 are candidates for a handoff. In this example, both base stations 115 and 120 are within the proximity threshold to the vector path and are both identified as candidate base stations. Note that base station 110 could identify the candidate base stations using additional or alternative criteria, and the step of identifying the candidate base stations could be omitted in some examples.

Base station 110 polls the plurality of candidate base stations 115 and 120 for capability information and processes the capability information to determine a set of the candidate base stations 115 and 120 that support the media type of the communication session (204). The capability information typically includes at least the different media types supported by the candidate base stations 115 and 120. Typically, the candidate base stations 115 and 120 would be preconfigured with knowledge of their supported media types and other capabilities, but this information could be provided and/or updated dynamically by LTE communication control system 140 or some other network element in some examples. In order to request and receive the capability information, base station 110 may exchange messages with the candidate base stations 115 and 120 using the X2 interface or some other connection between base stations. In some examples, the capability information could include communication load levels for each of the candidate base stations 115 and 120, along with other supported capabilities, such as bit rate, codec, resolution, and other communication session attributes. Base station 110 processes the capability information to determine a set of the candidate base stations 115 and 120 that support the media type of the communication session. This is typically achieved by base station 110 determining which media types are supported by the candidate base stations 115 and 120 based on the capability information, and including those candidate base stations 115 and 120 in the set that support the media type of the communication session. In this example, base station 110 determines that both of the candidate base stations 115 and 120 support the media type of the communication session and are thus included in the set.

Base station 110 selects a target base station for a handoff from the set of the candidate base stations 115 and 120 that support the media type and instructs UE 101 to initiate the handoff to the target base station (205). In this example, base station 110 selects base station 120 as the target base station for the handoff. Base station 110 could select the target base station 120 for the handoff based on several criteria. In some examples, base station 110 could select the target base station 120 for the handoff based on the communication load levels for each of the candidate base stations 115 and 120. Additionally or alternatively to the media type, base station 110 could also select the target base station 120 for the handoff based on the bit rate of the communication session of UE 101. After making the selection, base station 110 instructs UE 101 to initiate the handoff to the target base station 120. In response to receiving the handoff instruction, UE 101 would typically decode the instruction and initiate the handoff to the target base station 120 selected by base station 110.

Advantageously, base station 110 selects a target base station for a handoff for UE 101 based on the media type of a communication session of UE 101. When selecting the handoff target, base station 110 may also consider proximity to the vector path of UE 101, congestion mitigation through load balancing, bit rate associated with the communication session, and other criteria. In this manner, base station 110 selects a suitable target base station for a handoff for UE 101, providing an intelligent mechanism to direct traffic to base stations experiencing lower communication loads but that are still capable of supporting the media type of the session being transferred. The techniques described herein also provide the technical advantages of reduced network congestion and improved load balancing, resulting in better quality of service for UE 101 and other network users.

Now referring back to FIG. 1, UE 101 comprises any device having wireless communication connectivity with hardware and circuitry programmed to function as a telecommunications device, such as Radio Frequency (RF) communication circuitry and an antenna. The RF communication circuitry typically includes an amplifier, filter, modulator, and signal processing circuitry. UE 101 may also include a user interface, memory system, software, processing circuitry, or some other communication components. For example, UE 101 could comprise a telephone, transceiver, mobile phone, cellular phone, smartphone, computer, personal digital assistant (PDA), e-book, game console, mobile Internet device, wireless network interface card, media player, or some other wireless communication apparatus, including combinations thereof. UE 101 could comprise a dual-mode device capable of communicating over multiple wireless protocols, including LTE wireless networks and non-LTE wireless networks. Wireless network protocols that may be utilized by UE 101 include Code Division Multiple Access (CDMA) 1×RTT, Global System for Mobile communications (GSM), Universal Mobile Telecommunications System (UMTS), High-Speed Packet Access (HSPA), Evolution-Data Optimized (EV-DO), EV-DO rev. A, B, and C, Third Generation Partnership Project Long-Term Evolution (3GPP LTE), LTE Advanced, Worldwide Interoperability for Microwave Access (WiMAX), IEEE 802.11 protocols (Wi-Fi), Bluetooth, Internet, telephony, or any other wireless network protocol that facilitates communication between UE device 101 and a communication network.

Base stations 110, 115, and 120 each individually comprise RF communication circuitry and an antenna. The RF communication circuitry typically includes amplifiers, filters, RF modulators, transceivers, and signal processing circuitry. Base stations 110, 115, and 120 may also comprise a router, server, memory device, software, processing circuitry, cabling, power supply, network communication interface, structural support, or some other communication apparatus. Base stations 110, 115, and 120 may further comprise a processing system, such as a microprocessor, computer-readable storage device, and executable processing instructions, which may be used to provide access to communication services to various devices. Base stations 110, 115, and 120 could each comprise a macro base station, pico base station, wireless access node, Internet access node, telephony service node, wireless data access point, or some other wireless communication system—including combinations thereof. Some examples of base stations 110, 115, and 120 include a base transceiver station (BTS), base station controller (BSC), radio base station (RBS), Node B, enhanced Node B (eNodeB), pico eNodeB, relay node, relay backhaul node, picocell, femtocell, and others, including combinations thereof. Wireless network protocols that may be utilized by base stations 110, 115, and 120 include CDMA, GSM, UMTS, HSPA, EV-DO, EV-DO rev. A, B, and C, 3GPP LTE, LTE Advanced, WiMAX, Wi-Fi, Bluetooth, Internet, telephony, or some other communication format, including combinations thereof.

Communication network 130 comprises the core network of a wireless communication service provider, and could include routers, gateways, telecommunication switches, servers, processing systems, or other communication equipment and systems for providing communication and data services. In some examples, communication network 130 comprises a cellular voice and data network that can provide voice calls, text messages, data access, or other communication services provided over cellular or wireless communication networks. In some examples, communication network 130 includes equipment to provide wireless access to communication services within different coverage areas to user devices, route communications between content providers and user devices, and facilitate handoffs between equipment of different coverage areas, among other operations. Communication network 130 could comprise wireless communication nodes, telephony switches, Internet routers, network gateways, computer systems, communication links, or some other type of communication equipment—including combinations thereof. Communication network 130 may also comprise optical networks, asynchronous transfer mode (ATM) networks, packet networks, radio access networks (RAN), local area networks (LAN), metropolitan area networks (MAN), wide area networks (WAN), or other network topologies, equipment, or systems—including combinations thereof. Communication network 130 can also comprise elements such as Mobility Management Entity (MME) equipment, Home Subscriber Servers (HSS), Policy and Charging Rules Function (PCRF) nodes, packet data network gateways (P-GW), serving gateways (S-GW), base stations, base transceiver stations (BTS), base station controllers (BSC), eNodeB equipment, mobile switching centers (MSC), home location registers (HLR), radio node controllers (RNC), authentication, authorization and accounting (AAA) equipment, access service network gateways (ASN-GW), packet data switching nodes (PDSN), Internet access nodes, database systems, or other communication and control equipment. Communication network 130 may be configured to communicate over metallic, wireless, or optical links—including combinations thereof. Communication network 130 may be configured to use time-division multiplexing (TDM), Internet Protocol (IP), Ethernet, optical networking, wireless protocols, communication signaling, or some other communication format—including combinations thereof. In some examples, communication network 130 includes further access nodes and associated equipment for providing communication services to many wireless communication devices across a large geographic region.

LTE communication control system 140 comprises a processing system and communication transceiver. LTE communication control system 140 may also include other components such as a router, server, data storage system, and power supply. Communication control system 140 may reside in a single device or may be distributed across multiple devices. Communication control system 140 may be a discrete system or may be integrated within other systems—including other systems within communication system 100. In some examples, LTE communication control system 140 could comprise a computing system, LTE network element, mobility management entity (MME), policy and charging rules function (PCRF), home subscriber server (HSS), remote diagnostics system, surveillance system, session initiation protocol (SIP) server, authentication, authorization, and accounting (AAA) server, home agent, packet data serving node (PDSN), network switch, mobile switching center, router, switching system, packet gateway, network gateway system, Internet access node, application server, service node, firewall, or some other communication system—including combinations thereof.

Wireless communication links 111-113 use the air or space as the transport medium. Wireless communication links 111-113 may use various protocols, such as CDMA, GSM, UMTS, HSPA, EV-DO, EV-DO rev. A, B, and C, 3GPP LTE, LTE Advanced, WiMAX, Wi-Fi, Bluetooth, Internet, telephony, or some other communication format—including combinations thereof. Wireless communication links 111-113 may each comprise many different signals sharing the same link. For example, each wireless communication link 111-113 could include multiple signals operating in a single propagation path comprising multiple communication sessions, frequencies, timeslots, transportation ports, logical transportation links, network sockets, IP sockets, packets, or communication directions, including combinations thereof.

Communication links 121-124 use metal, air, space, optical fiber such as glass or plastic, or some other material as the transport medium—including combinations thereof. Communication links 121-124 could use various communication protocols, such as TDM, IP, Ethernet, telephony, optical networking, hybrid fiber coax (HFC), communication signaling, wireless protocols such as such as CDMA, GSM, UMTS, HSPA, EV-DO, EV-DO rev. A, B, and C, 3GPP LTE, LTE Advanced, WiMAX, Wi-Fi, Bluetooth, or some other communication format, including combinations thereof. Communication links 121-124 may be a direct links or could include intermediate networks, systems, or devices.

Figure 3:
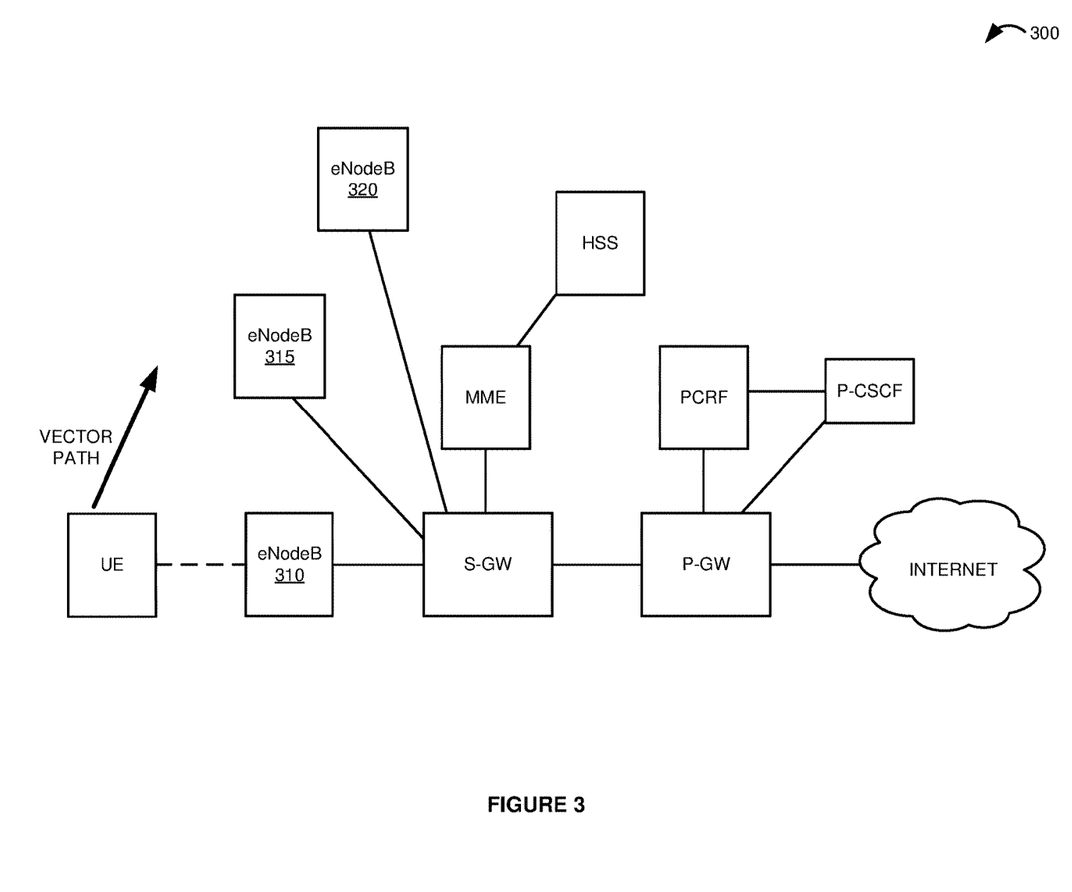
FIG. 3 is a block diagram that illustrates an LTE communication system in an exemplary embodiment.

FIG. 3 is a block diagram that illustrates LTE communication system 300 in an exemplary embodiment. LTE communication system 300 is an example of communication system 100, although communication system 100 may use alternative configurations and operations. LTE communication system 300 includes a User Equipment (UE) device and three eNodeB base stations 310, 315, and 320 that are in communication with network elements of the LTE communication network. The LTE communication network in this example includes a mobility management entity (MME), serving gateway (S-GW), packet data network gateway (P-GW), home subscriber server (HSS), policy and charging rules function (PCRF), proxy-call session control function (P-CSCF) and other network elements typically found in an LTE communication network that are not shown to simplify the diagram.

In operation, a user typically operates the UE to engage in an Internet data session via the LTE access network. Once connected, the user can participate in a data-based voice session using Voice over LTE (VoLTE), utilize applications such as Internet browsers, receive streaming video and audio, or engage in any other data session activity. In this example, the UE is initially served by eNodeB 310, as shown in FIG. 3. The UE is traveling in the vector path indicated by the arrow on FIG. 3, towards eNodeB 315 and 320. A detailed description of one technique that the serving eNodeB 310 may utilize to select a handoff target for the UE will now be discussed with respect to FIG. 4.

Figure 4:
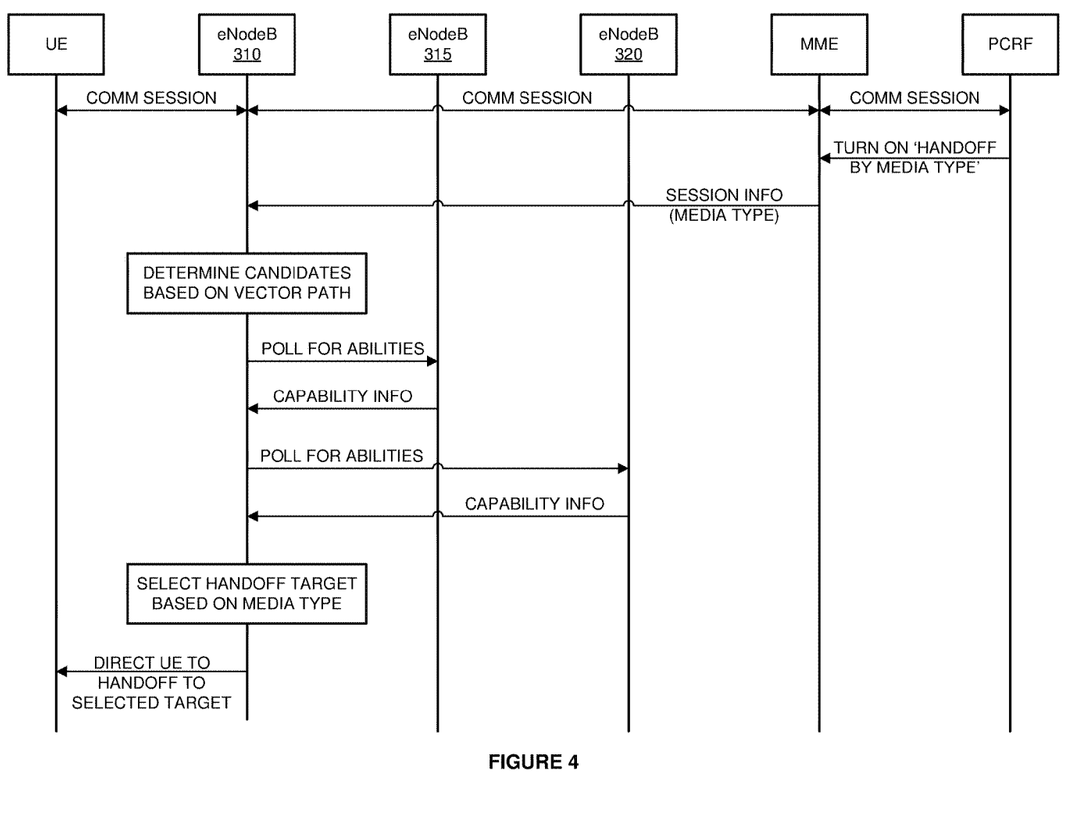
FIG. 4 is a sequence diagram that illustrates an operation of the LTE communication system in an exemplary embodiment.

FIG. 4 is a sequence diagram that illustrates an operation of LTE communication system 300 in an exemplary embodiment. The techniques discussed herein enable intelligent handoffs in session mobility based on types of media traffic. As shown FIG. 4, a connection is initially established between the UE, eNodeB 310, and elements of the LTE communication network for a communication session. The UE exchanges session communications with eNodeB 310 pursuant to the communication session, which could include any type of media data.

At some point before, during, or after the communication session for the UE is established, the PCRF in the LTE network signals the MME to turn on or activate the 'handoff by media type' handoff target selection algorithm. In some examples, the MME could be configured to always utilize the 'handoff by media type' target selection algorithm. The PCRF could also signal the MME to activate this algorithm for any reason. For example, the PCRF could signal the MME to start using the handoff algorithm whenever the communication loading in the geographic area associated with the MME exceeds a loading threshold. The PCRF could also activate the algorithm on a per-UE basis, or could instruct the MME to only employ the handoff target selection algorithm for a particular media type, such as UE devices engaged in communication sessions of a video media type.

Responsive to receiving the signal to activate the 'handoff by media type' algorithm, the MME transfers session information to eNodeB 310. The session information includes the current media type of the communication session of the UE, such as text, image, audio, video, application, and the like. The session information could also include other information about the UE and the communication session, such as a vector of the UE, bit rate of the communication session, and any other data. In some examples, instead of sending the session information, the MME sends a message to eNodeB 310 that instructs eNodeB 310 to start tracking and storing the media type, bit rate, UE vector, and other session information.

Regardless of how eNodeB 310 receives the vector of the UE, eNodeB 310 determines handoff candidate eNodeB base stations for the UE based on the vector path. In this example, both eNodeB 315 and 320 are within the vector path of the UE, and are thus identified by eNodeB 310 as possible handoff candidates. In response, eNodeB 310 polls eNodeB 315 and 320 for their abilities, and responsively receives capability information from each eNodeB 315 and 320. The eNodeB base stations 310, 315, and 320 would typically request and receive the capability information using an eNodeB intra-communication mechanism, such as the X2 interface. The capability information may include the present state of variables such as current communication loading levels or available bandwidth, as well as the different media types and attributes supported by each eNodeB 315 and 320. Using this capability information, eNodeB 310 selects a handoff target for the UE from among the candidate base stations eNodeB 315 and 320 based on the media type of the communication session. Additionally or alternatively, when selecting the handoff target, eNodeB 310 could also factor in other criteria, such as load balancing, bit rate support, or any other media attributes or session information. For example, eNodeB 310 might select eNodeB 320 as the handoff target based on eNodeB 320 supporting the media type of the session and having more available bandwidth to support the session than eNodeB 315. Accordingly, eNodeB 310 would direct the UE to handoff to the selected target eNodeB 320 that is most suitable to accept the traffic. In this manner, the traffic from the UE is intelligently transferred to an eNodeB 320 experiencing low congestion based on the media type of the traffic, thereby optimizing the network and enabling more efficient operations.

Figure 5:
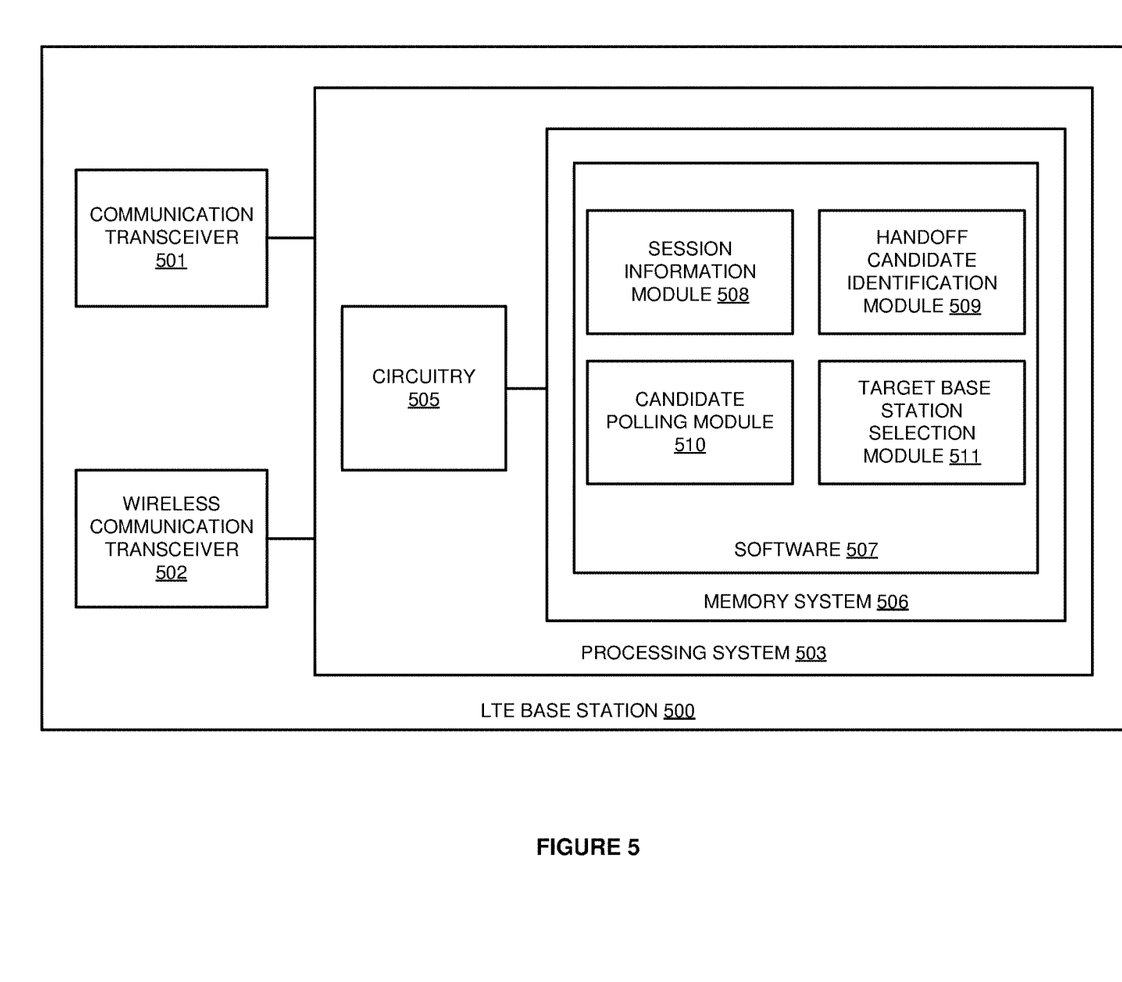
FIG. 5 is a block diagram that illustrates an LTE base station.

FIG. 5 is a block diagram that illustrates LTE base station 500. LTE base station 500 provides an example of base station 110, although base station 110 may have alternative configurations. LTE base station 500 comprises communication transceiver 501, wireless communication transceiver 502, and processing system 503. Processing system 503 is linked to communication transceiver 501 and wireless communication transceiver 502. Processing system 503 includes processing circuitry 505 and memory system 506 that stores operating software 507. Operating software 507 comprises software modules 508-511.

Communication transceiver 501 comprises components that communicate over communication links, such as network cards, ports, RF transceivers, processing circuitry and software, or some other communication components. Communication transceiver 501 may be configured to communicate over metallic, wireless, or optical links. Communication transceiver 501 may be configured to use TDM, IP, Ethernet, optical networking, wireless protocols, communication signaling, or some other communication format, including combinations thereof. Communication transceiver 501 could be configured to receive session information transmitted from an LTE communication control system, the session information including a media type of a communication session and a vector associated with a UE device.

Wireless communication transceiver 502 comprises RF communication circuitry and an antenna. The RF communication circuitry typically includes an amplifier, filter, RF modulator, and signal processing circuitry. Wireless communication transceiver 502 may also include a memory system, software, processing circuitry, or some other communication device. Wireless communication transceiver 502 may use various protocols, such as CDMA, GSM, UMTS, HSPA, EV-DO, EV-DO rev. A, B, and C, 3GPP LTE, WiMAX, Wi-Fi, Bluetooth, Internet, telephony, or some other wireless communication format, including combinations thereof. Wireless communication transceiver 502 could be configured to exchange session communications with a UE device during a communication session.

Processing circuitry 505 comprises microprocessor and other circuitry that retrieves and executes operating software 507 from memory system 506. Processing circuitry 505 may comprise a single device or could be distributed across multiple devices, including devices in different geographic areas. Processing circuitry 505 may be embedded in various types of equipment. Examples of processing circuitry 505 include central processing units, application specific processors, logic devices, and/or any type of computer processing devices, including combinations thereof. Memory system 506 comprises a non-transitory computer readable storage medium readable by processing circuitry 505 and capable of storing software 507, such as a disk drive, flash drive, data storage circuitry, or some other hardware memory apparatus. Memory system 506 may comprise a single device or could be distributed across multiple devices, including devices in different geographic areas. Memory system 506 may be embedded in various types of equipment. In some examples, a computer apparatus could comprise memory system 506 and operating software 507. Operating software 507 may be implemented in program instructions and may be executed by processing system 503. Operating software 507 comprises computer programs, firmware, or some other form of machine-readable processing instructions. Operating software 507 may include an operating system, utilities, drivers, network interfaces, applications, or some other type of software. In this example, operating software 507 comprises software modules 508-511, although software 507 could have alternative configurations in other examples.

When executed by circuitry 505, operating software 507 directs processing system 503 to operate as described herein for base station 110. In particular, operating software 507 may direct processing system 503 to direct wireless communication transceiver 502 to exchange session communications with a User Equipment (UE) device during a communication session. Operating software 507 may also direct processing system 503 to direct communication transceiver 501 to receive session information transmitted from an LTE communication control system, the session information including a media type of the communication session and a vector associated with the UE device. Operating software 507 further directs processing system 503 to identify a plurality of candidate base stations within a proximity threshold to a path of the vector associated with the UE device. In addition, operating software 507 directs processing system 503 to poll the plurality of candidate base stations for capability information and process the capability information to determine a set of the candidate base stations that support the media type of the communication session. Operating software 507 further directs processing system 503 to select a target base station for a handoff from the set of the candidate base stations that support the media type and instruct the UE device to initiate the handoff to the target base station.

In this example, operating software 507 comprises a session information software module 508 that receives session information transmitted from an LTE communication control system, the session information including a media type of a communication session and a vector associated with a UE device. Operating software 507 also comprises a handoff candidate identification software module 509 that identifies a plurality of candidate base stations within a proximity threshold to a path of the vector associated with the UE device. Operating software 507 further comprises a candidate polling software module 510 that polls the plurality of candidate base stations for capability information and processes the capability information to determine a set of the candidate base stations that support the media type of the communication session. Operating software 507 also comprises a target base station selection software module 511 that selects a target base station for a handoff from the set of the candidate base stations that support the media type and instructs the UE device to initiate the handoff to the target base station.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a Long-Term Evolution (LTE) base station to facilitate a handoff in an LTE communication system, the method comprising:

the LTE base station exchanging video communications with User Equipment (UE) during a video session;

the LTE base station receiving video session information transmitted from a Mobility Management Entity (MME) that indicates a video session bit rate, a UE location, a UE direction, and a UE velocity;

the LTE base station identifying candidate base stations within a proximity threshold to a geographic path indicated by the UE location, the UE direction, and the UE velocity;

the LTE base station polling the candidate base stations for abilities to support the video session bit rate; and the LTE base station selecting a target base station from the candidate base stations based on the abilities to support the video session bit rate; and the LTE base station instructing the UE to initiate the handoff to the target base station.

2. A computer apparatus to operate a Long-Term Evolution (LTE) base station to facilitate a handoff in an LTE communication system, the apparatus comprising:

software instructions configured, when executed by the LTE base station, to direct the LTE base station to exchange video communications with User Equipment (UE) during a video session, receive video session information transmitted from a Mobility Management Entity (MME) that indicates a video session bit rate, a UE location, a UE direction, and a UE velocity, identify candidate base stations within a proximity threshold to a geographic path indicated by the UE location, the UE direction, and the UE velocity, poll the candidate base stations for abilities to support the video session bit rate, select a target base station from the candidate base stations based on the abilities to support the video session bit rate, and instruct the UE to initiate the handoff to the target base station; and a processor and at least one non-transitory computer-readable storage medium storing the software instructions to operate the LTE base station, when read and executed by the processor.

3. A Long-Term Evolution (LTE) base station to facilitate a handoff in an LTE communication system, the LTE base station comprising:

a wireless communication transceiver configured to exchange video communications with User Equipment (UE) during a video session;

a communication transceiver configured to receive video session information transmitted from a Mobility Management Entity (MME) that indicates a video session bit rate, a UE location, a UE direction, and a UE velocity; and a microprocessor configured to identify candidate base stations within a proximity threshold to a geographic path indicated by the UE location, the UE direction, and the UE velocity, poll the candidate base stations for abilities to support the video session bit rate, select a target base station from the candidate base stations based on the abilities to support the video session bit rate, and instruct the UE to initiate the handoff to the target base station.

* * * * *